United States Patent
Zahn et al.

(10) Patent No.: US 6,720,992 B1
(45) Date of Patent: Apr. 13, 2004

(54) METHOD FOR IMPROVING THE CONTRAST REPRODUCTION OF DIGITIZED IMAGES

(76) Inventors: Wolfgang Zahn, Landfriedstrasse 1, 81547 München (DE); Werner Ritter von Stein, Mispelweg 20, 22179 Hamburg (DE)

( * ) Notice: Subject to any disclaimer, the term of this patent is extended or adjusted under 35 U.S.C. 154(b) by 0 days.

(21) Appl. No.: 09/430,459

(22) Filed: Oct. 29, 1999

(30) Foreign Application Priority Data

Aug. 4, 1999 (DE) .................................. OS 199 36 615

(51) Int. Cl.[7] .......................... H04N 9/04; H04N 5/202; H04N 5/225
(52) U.S. Cl. ................. 348/207.99; 348/342; 348/254
(58) Field of Search ......................................... 348/342

(56) References Cited

U.S. PATENT DOCUMENTS

| | | | | |
|---|---|---|---|---|
| 5,051,902 A | * | 9/1991 | Hishinuma | 382/263 |
| 5,319,719 A | * | 6/1994 | Nakazawa et al. | 382/264 |
| 5,363,209 A | * | 11/1994 | Eschbach et al. | 358/445 |
| 5,774,599 A | * | 6/1998 | Muka et al. | 382/263 |
| 6,069,979 A | * | 5/2000 | VanMetter | 382/263 |
| 6,094,511 A | * | 7/2000 | Metcalfe et al. | 382/263 |
| 6,146,817 A | * | 11/2000 | Zahn et al. | 358/447 |
| 6,285,798 B1 | * | 9/2001 | Lee | 382/263 |
| 6,343,158 B1 | * | 1/2002 | Shiohara | 382/264 |
| 6,556,720 B1 | * | 4/2003 | Avinash | 382/263 |

\* cited by examiner

*Primary Examiner*—Andrew Christensen
*Assistant Examiner*—Tia M. Harris
(74) *Attorney, Agent, or Firm*—Glenn Patent Group; Michael A. Glenn

(57) ABSTRACT

The optimum reproduction of high-contrast motifs in digital imaging technology is limited owing to the limited dynamic range of present-day image sensors. The reproduction of high-contrast motifs is intended to be improved using active pixel image sensors. The sensitivity of the sensor pixels is adapted, controlled in an analogous manner to the blurred brightness distribution in the motif, to ensure that the dark and bright image regions of the motif are also reproduced, well illuminated, without any loss of detailed contrast. This results in a particularly natural and balanced image impression. This method may be used in numerous fields for digital image processing.

8 Claims, 4 Drawing Sheets

METHOD FOR IMPROVING THE CONTRAST REPRODUCTION OF DIGITIZED IMAGES

BACKGROUND OF THE INVENTION

1. Technical Field

The invention relates to a method which allows considerable improvement in the recording and reproduction of the light/dark contrast in digital images. The invention is thus of major interest for digital image processing (imaging).

2. Description of the Prior Art

The typical image processing process will be explained, first of all, using a flowchart to provide better understanding of what is stated in the following text. In this case, digital imaging is broken down into three blocks (FIG. 1). As is evident without any difficulty from the inscriptions on the figure, the scanning of the original to be imaged is carried out in Block 1 by means of an image sensor or scanner. The image data obtained in this way are then processed in a next step (Block 2). Two different methods may be used in this case:

1.) Interactive image processing, in which the image can be corrected or edited as required by manual processing of the data record on a screen, and/or
2.) Automatic image processing, in which standardized computation runs are possible, which in turn allows very short process times. In this way, image characteristics such as color neutrality, brightness, and image contrast can be optimized.

Finally, the image data records which have been improved by one method or the other are stored and are then available for the image to be output via various imaging systems, which process the images in the form of pixels (Block 3). These include, for example, the CRT screen, exposure of photographic materials by pixels, cinematic projection of digitally recorded "movies" by means of laser projectors or mirror chips (DLP), newspaper printing or printing out on inkjet printers, to name but a few.

While the scaling technique for recording and for pixel image reproduction must be matched to the respective application purposes, it is possible to use largely standard techniques for the image processing activities that occur in between. For example, time consuming interactive image processing is predominantly used for individual images of All types (for example in the advertizing field), while image processing is becoming increasingly important, for example for large-scale photographic copying, in the TV or amateur-video area or for the processing of digitized films. In this case, automatic contrast adaptation, in particular, plays an important role in addition to adaptation of the image brightness and color reproduction.

Contrast adaptation is therefore required, in particular, because natural image reproduction is adversely affected, above all, by two contrast problems. On the one hand, most reproduction media, for example photographic paper, printed paper, or even screens, cannot always satisfactorily reproduce relatively major original contrasts and, on the other hand, it is often necessary to work with the respectively currently available lighting conditions (available light) during recording, that is to say lighting conditions which are unbalanced and, in some circumstances, change rapidly. With regard to image reproduction, both problems can lead to scenes with, for example, overexposed sky sections and/or black shadows with no image information in them.

For some years, methods have been known which are suitable for reducing such image defects by subsequent image data processing. For example, by linking the image data to data records which contain only low local frequencies from the original (i.e. blurred masking), it is possible to reproduce excessively bright image parts attenuated and shadowed areas brightened in the processed image data records of the original. Thus, as a fundamental rule for improving image contrast the contrast of the relatively large—area image sections (i.e. the low local frequencies) reduced, while the detail contrast (important for image brilliance) remains unaffected.

By superimposing a number of local frequency extracts, each having different contrast in one mask, it is even possible to roughly copy the visual acuity of the eye. This blurred mask type, which is characterized by the name multilayer mask, can be used in a corrective sense in the same way for reproduction of originals. Applied to the image data record supplied by the image sensor—it allows images to be produced with a contrast impression that is still more natural.

Blurred masking with the aid of LCDs for mass copying of photographic originals has already been disclosed in OS DE 4040498 [sic]—likewise with the aim of improving the handling of exposure problems in particularly high-contrast originals, methods have also been described for the photographic area which allow the sensitivity of flat photographic material to be attenuated or emphasized in an analogous manner to rough brightness distribution of the original to be imaged. Using such a method; the details in the shadow areas and in the highlights could then also be reproduced more clearly, that is to say with sufficiently good exposure (See DE 196 32 429).

The use of blurred masks (including the multilayer mask mentioned above) both in the video sector and in conjunction with influencing the sensitivity of image sensors in areas, in an analogous manner to masks, have been disclosed in Patent Specification DE 19713 648.

The digital contrast adaptation described in the above mentioned documents generally works in such a way that an attempt is made to attenuate or to amplify the image signals (taken from the image sensor) the light and dark image areas retrospectively in areas. It is obvious that such image processing methods can lead to really good results only if the highlighted and shadowed areas which may be present in the data records are correctly exposed and have good information content. As has already been addressed in the last-mentioned Patent Specification (DE 19713 648), this would best be ensured by using image sensors whose light sensitivity can be adapted in areas to brightness conditions in the highlighted and shadowed zones.

Such image sensors now have acceptable resolution and have now been marketed for some time under the name CMOS active pixel sensors. The sensitivity (or the exposure time) of the pixels in these image sensors can be programmed individually. Their use promises the capability to achieve a previously unknown quality by using automatic processes to form image data records. At the same time considerable proportion of the "work" of the image processing station (FIG. 1, Block 2) would be carried out by the active pixel digital camera itself.

SUMMARY OF THE INVENTION

The aim of the present application is to describe suitable logic and actuation principles for such image sensors (referred to for short as AP image sensors in the following text), by means of which it is possible to obtain image data records with balanced contrast.

DETAILED DESCRIPTION OF THE PREFERRED EMBODIMENT OF THE INVENTION

In the case of the first method (FIG. 2), also called the 1-chip solution for short, the original (1) is first of all imaged in focus on the AP image sensor (2). In this case, the distribution of its pixel sensitivity is intended to be roughly uniform. Digitized image data from this image are then supplied according to Step 1 to a computer (3), in which a blurred monochromatic positive of the original is calculated by means of blurring algorithms.

In the simplest case, this blurred image data record of the original ("low-pass filter") is a low-frequency, local frequency area extract from the original. Its corrective effect depends not only on the amount of blurring but also on the contrast given to it in the calculation, that is to say the density difference between its brightest and darkest area. For simplicity, this data record is also called a "positive blurred mask."

Because only the contrast and the amount of blurring are important for the further use of the mask, but not its absolute brightness levels, the mask still has to be normalized to a specific brightness level, preferably to the mean level of the logarithm of brightness. The mask then comprises brightness levels which are greater than or less than the mean value.

Figure 1:
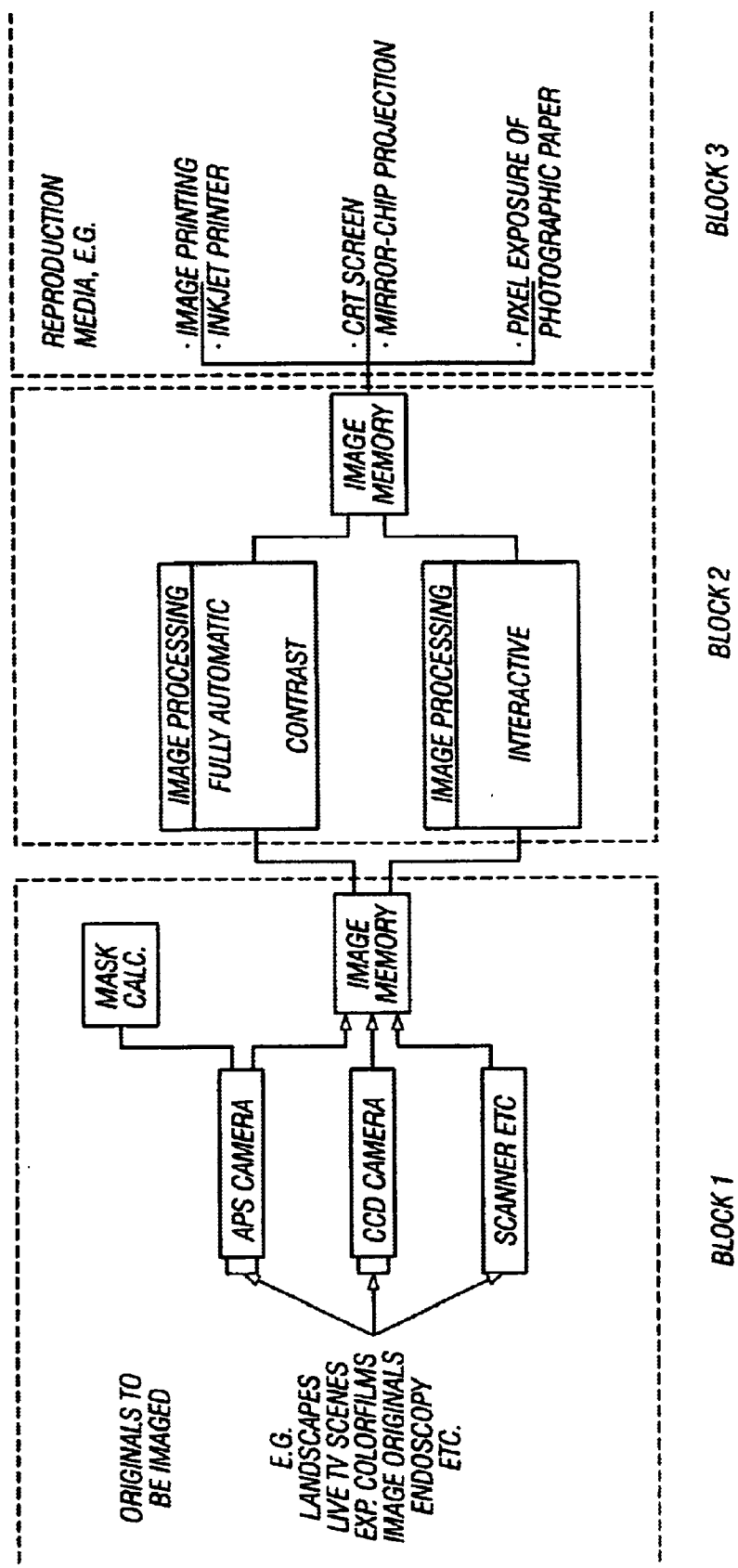
FIG. 1 is a block diagram of a prior art image processing system.
Figure 2:
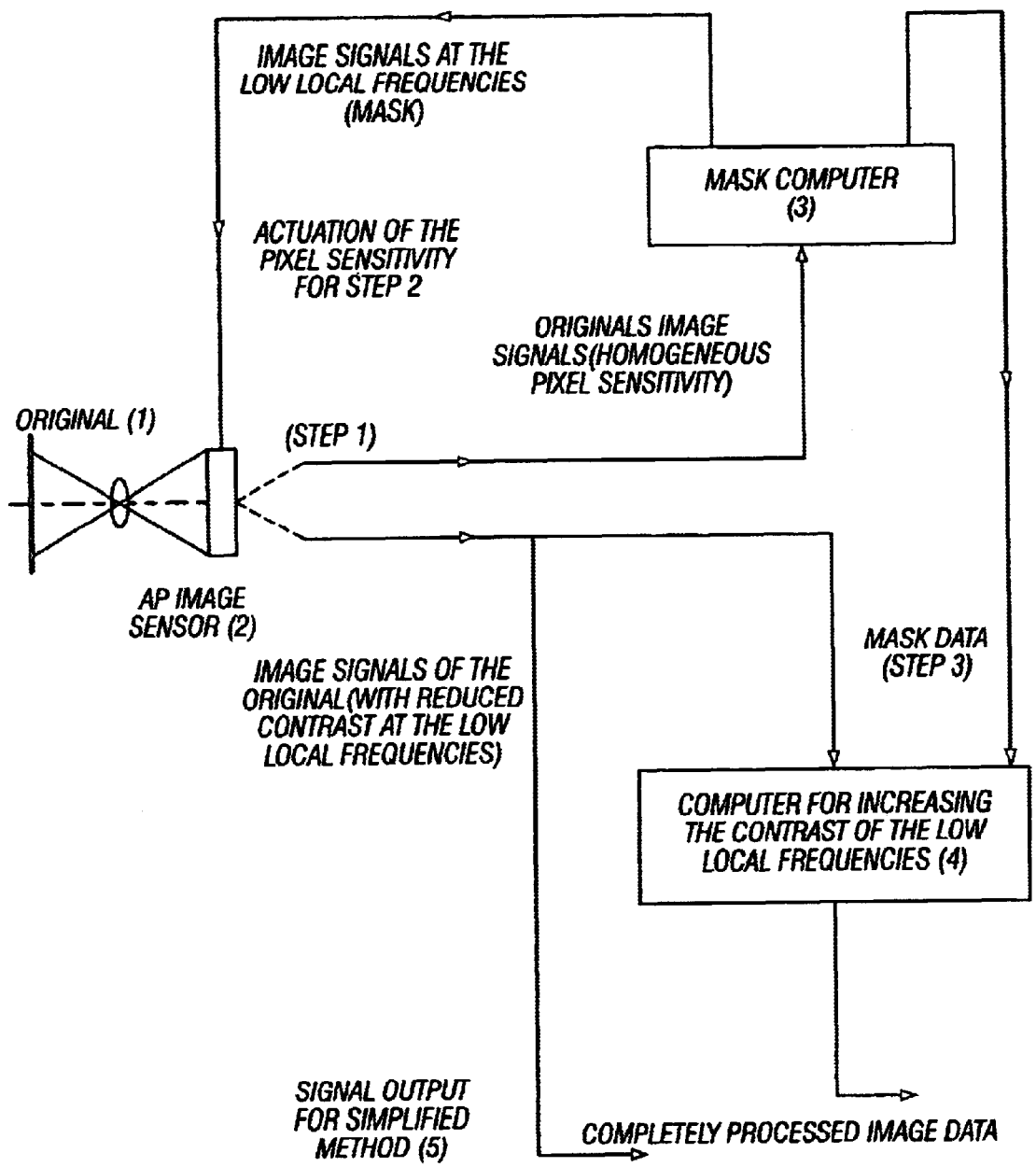
FIG. 2 is a block diagram of an image processing system.

This breakdown may also be carried out additionally, in the mask computer by means of special boundary conditions (see also DE 197 13 648, FIG. 2, curves 7e and 7f).

Finally, the sensitivity of each pixel in the AP image sensor is programmed in an analogous manner to the normalized mask values in such a way that (assuming a positive mask) the sensitivity of the pixels is reduced below the mean sensitivity in the brighter areas of the blurred mask, and is increased in the darker areas while, if a negative mask is generated which is likewise possible—the sensitivity is increased in the brighter areas, and is reduced in the darker areas.

Finally—with the original still imaged in focus on the chip—in step 2 (FIG. 2), the improved video image of the original is read with the sensitivity distribution on the AP image sensor programmed in this way, and is stored, for example, for further processing or reproduction.

The described sequence accordingly includes alternately (in time) reading image data on the one hand on the basis of the (roughly) homogeneous distribution of the sensitivity of all the pixels, followed by a mask-analogous distribution.

A solution which is optimum in imaging terms, and in which the advantages of the AP image sensor are fully used, is for the contrast of the mask and the sensitivity distribution on the AP image sensor resulting from this to be dimensioned such that, in the image data record of the original that is read, the originally light and dark areas of the original because a mean brightness image signal, which is roughly at the same level. This may be regarded as contrast compression in the area of low local frequencies in the motif.

Figure 3:
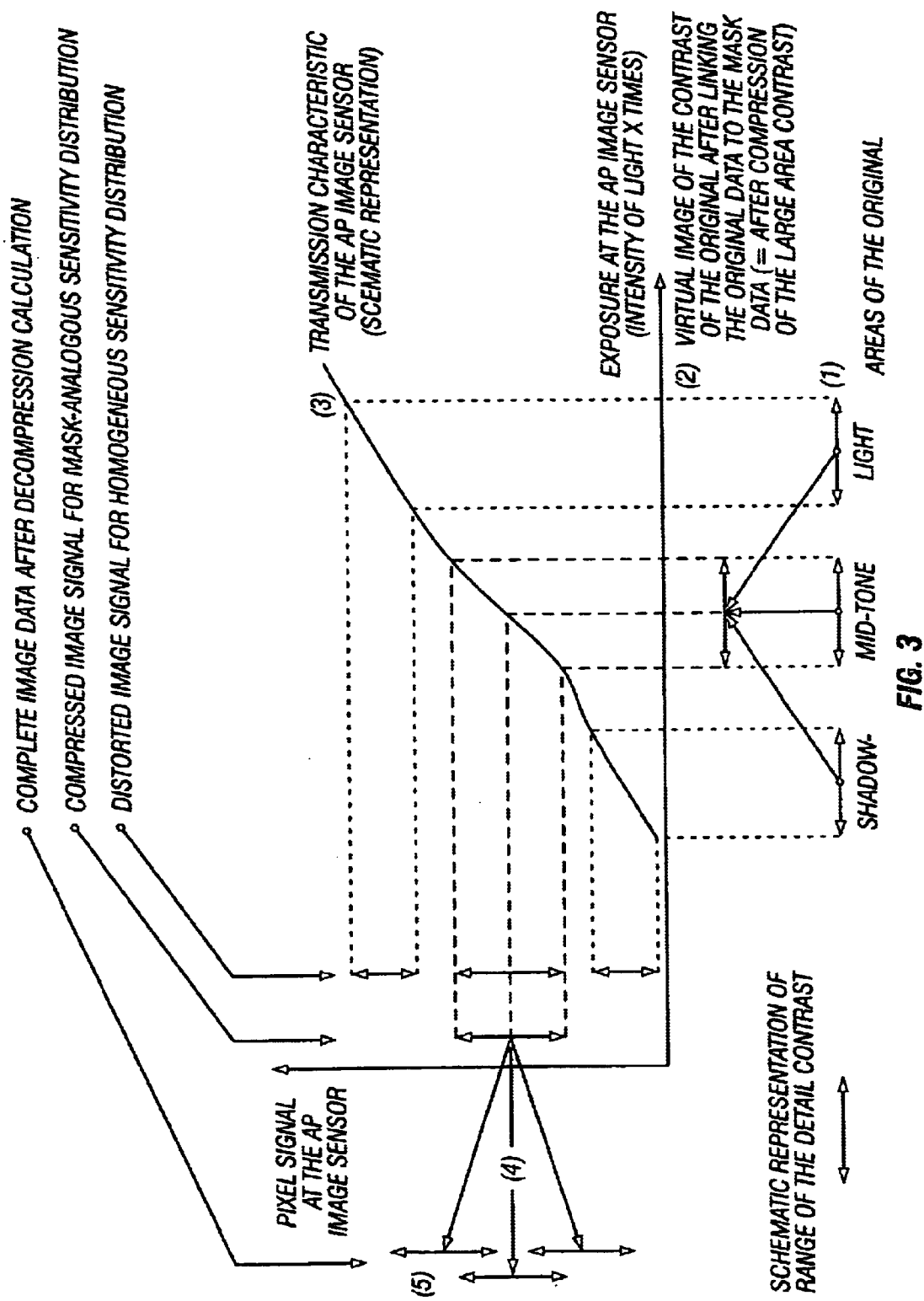
FIG. 3 is a flow diagram of an image processing system.

FIG. 3 shows this process in terms of imaging technology. By linking the brightness levels of the original (1) with the sensitivity profile of the normalized mask on the image sensor, the large-area contrast is, virtually removed from motif (2). The full detail contrast from all brightness areas of the original image can thus be transferred using the (limited) optimum region of the characteristic (3). Subsequent data decompression (4) by means of a computer returns the large-area contrast, which is the primary desired factor and hat been slightly reduced in comparison to the original, to the data record (5).

Thus, starting from the image signals (FIG. 2, step 2), the said decompression of the previously smoothed-out contrast of the lower local frequencies must be carried out in a subsequent computation operation (FIG. 2, step 3 and the computer 4) with the aid of the normalized mask data record which was initially produced from the motif in the computer (3) and was stored, to achieve not only the image details of the original, which are now transmitted in an acceptably good manner, but also reproduction of the light/shadow contrasts that is as natural as possible.

In this way, the approach becomes closer to the acuity of the eye and this is ensured, inter alia, particular in that all the details are clearly perceptible even, for example, in heavily shadowed parts of the motif.

In addition to this special process sequence, which is aimed at an optimum image processing result, a large number of standard solutions are also conceivable, which are simpler but require less computation work for this process. For example, the contrast of the normalized mask which is used to adapt the sensitivity of the pixels in the AP image sensor can be set such that the reduction (which is desired with regard to the initial data) of the low local frequency image contrast is achieved directly. The detail information quality that results in this case (and is in any case improved) in the shadows and the highlights would then have to be accepted as it occurred on a case-by-case basis. Thus, with this processing approach, FIG. 2, signal output (5), it is possible to dispense with the procedure of computationally raising the contrast again. All the described method steps also apply without any limitation to color cameras because the sensitivity control extends in the same way to all color-filtered pixels.

These image processing processes described in the text above can be carried out fully automatically, despite their apparent complexity. Namely, in principle, contrast correction is based on the large area contrast in the original data record, and it thus turns out to be less, the less the contrast is.

Furthermore, major trials in the photographic area have shown that any significant percentage reduction in the large-area contrast (but not in the detail contrast) improves the reality of the image impression.

Figure 4:
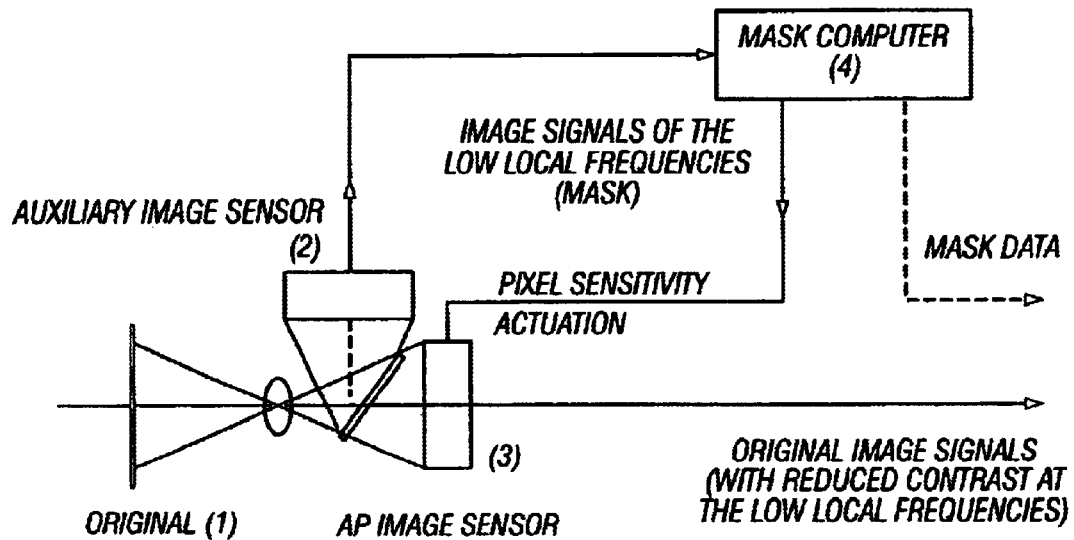
FIG. 4 is a block diagram of an image processing system according to an alternative embodiment of the invention.

A variant of the previous method, the 2-chip solution, is described in FIG. 4. In the 2-chip solution, an auxiliary image sensor (2) is placed alongside the AP image sensor (3), and carries out the function of mask preparation for the adaptation of the pixel sensitivity in the AP image sensor (3). The auxiliary image sensor (2) may be, for example, a normal CCD image sensor on which the original (1) is imaged in focus, conforming to the image on the AP image sensor (3). This image is then read and is converted in a computer (4) into the mask data RECORD. This normalized mask is transferred, in an analogous manner to the 1-chip solution, to the AP image sensor (3) for mask-analagous adjustment of the sensitivity of its pixels. The rest of the sequence is then exactly the same as the procedure for the 1-chip solution. The advantage of this method is that the AP image sensor is continuously supplied with a blurred mask and need not alternately produce the initial data record for mask production. This allows a higher image frequency to be achieved.

Figure 5:
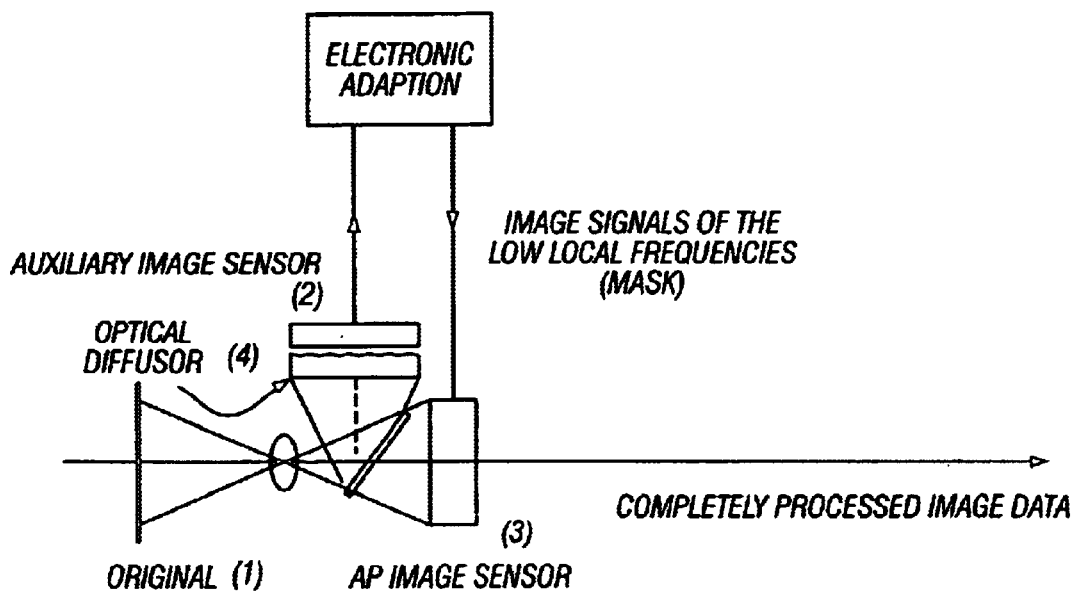
FIG. 5 is a block diagram of an auxiliary image sensor according to the invention.

Optical mask production, which is feasible, for example, with cheap still-video cameras, may be considered as a further variant for forming a mask data record. To this end, in the case of a 1-chip solution (not shown as a figure), it is necessary to install a light-scattering medium which can be fitted in the imaging beam path and by means of which the original is imaged blurred on the AP image sensor or—in the case of the 2-chip solution—on the auxiliary sensor (2), FIG. 5. In this case, the mask does not need to be generated by computer. However, if a 1-chip solution is used, the scattering medium must be removed from the imaging beam path again after exposure. If used in conjunction with an auxiliary imaging sensor (2), the scattering medium (4) may remain permanently in the beam path. The data record of the blurred mask produced by this method and circumvents mask calculation in a direct way is also used, as in the previously described cases, for actuation of the sensitivity of the pixels in the AP image sensor (3).

Finally, it should also be noted that situation often occurs in which the field of view in the image corners is considerably darkened due, for example, to mounting vignetting of the imaging objective. An additional advantageous characteristic of the AP Image sensor is that such non-uniformities in the illumination of the image plate can be co compensated for, in the signal, by means of a permanently programmed-in sensitivity rule. Specifically, it is important for darkened areas produced, for example, by the camera objective, to be compensated for automatically to ensure that they do not enter the motif image processing.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. Method for contrast control for images which are to be recorded digitally, by using an electronic image sensor/scanner, which comprises the light-sensitive pixels of an active pixel image scanner ("AP") whose effective sensitivity can be programmed individually, and whose sensitivity is varied to produce an image data record of an original that is to be imaged, (referred to as the "mask" herein) as a function of the brightness levels of an image data record of the original which comprises selected local frequency bands, characterized in that;

an initial data record is produced from the original on the AP image sensor and is to be used for calculation of the associated mask, in which case the pixel sensitivity is intended to be distributed roughly homogeneously;

in that the data record obtained in this way is passed (after being converted into a mask by computer means) to the AP image sensor preferably in the form of a mask normalized with respect to its average value;

in that, to produce the improved data record of the original on the AP image sensor, the sensitivity of its individual pixels is reprogrammed, before exposure, in such a manner that—in the case of a positive mask—the sensitivity of the pixels is reduced in comparison with the mean sensitivity where the mask data record of the original has areas which are brighter than the average and as a function of a threshold which can be predetermined, and/or the sensitivity of the pixels is increased in comparison with the mean sensitivity where, in a corresponding manner, the mask data record of the original has darker areas; and in that the procedure when processing with a negative mask corresponds to this, but in the opposite sense.

2. Method according to claim 1, further characterized in that the contrast of the mask is dimensioned such that the resulting distribution of the pixel sensitivity leads, after subsequent exposure with the original, to an original data record in which those image regions whose image contents correspond to the bright and dark mask areas respectively have roughly the same integral brightness levels (contrast compression) or in which these image regions have only brightness differences such that the image regions are imaged at least in the region of the approximately straight part of the characteristic of the AP image sensor; and in that this image data record produced in this way is then modified, if necessary, preferably using computer means in such a manner that its large-area contrast is reduced to a level which gives a natural image impression.

3. Method according to claim 1, further characterized in that the mean pixel sensitivity for the exposure of the original on the AP image sensor is derived from the brightness levels of the pixels of the mask.

4. Method according to claim 1, further characterized in that the initial data record of the original to be imaged to generate the mask is obtained, conforming to the image, on any desired second image sensor or scanner; and in that the mask of the original is calculated from this data record in a computer and is passed on to the AP image sensor to adjust the sensitivity of the pixels.

5. Method according to claim 1, further characterized in that, instead of using a computer to produce the mask for sensitivity control of the pixels on the AP image sensor, the blurred optical image of the motif is selected by means of an optically scattering medium onto the respective image receiver, and the subsequent storage of the normalized mask values is selected in a frame store.

6. Method according to claim 1, further characterized in that brightness deviations in the image plane of the AP sensor which are not caused by the content of the original are not included in the calculation of the original mask, but are continuously smoothed out by means of a permanently programmed sensitivity rule.

7. The method of claim 1, wherein effective sensitivity is exposure time.

8. The method of claim 3, wherein pixel sensitivity is exposure time.

* * * * *